Inventor
Albert W. Lavers
By Allan R. Redrow
Attorney

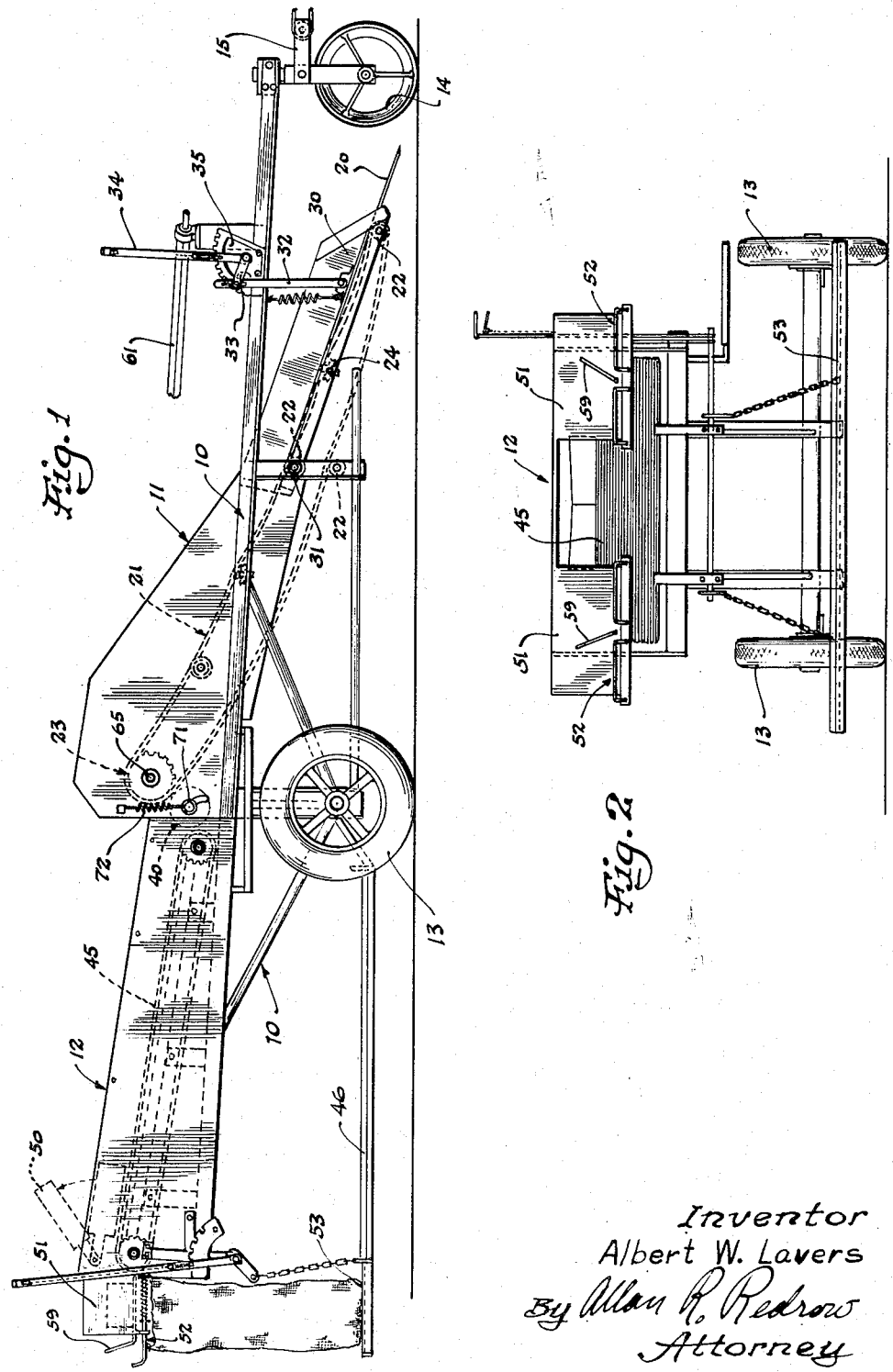

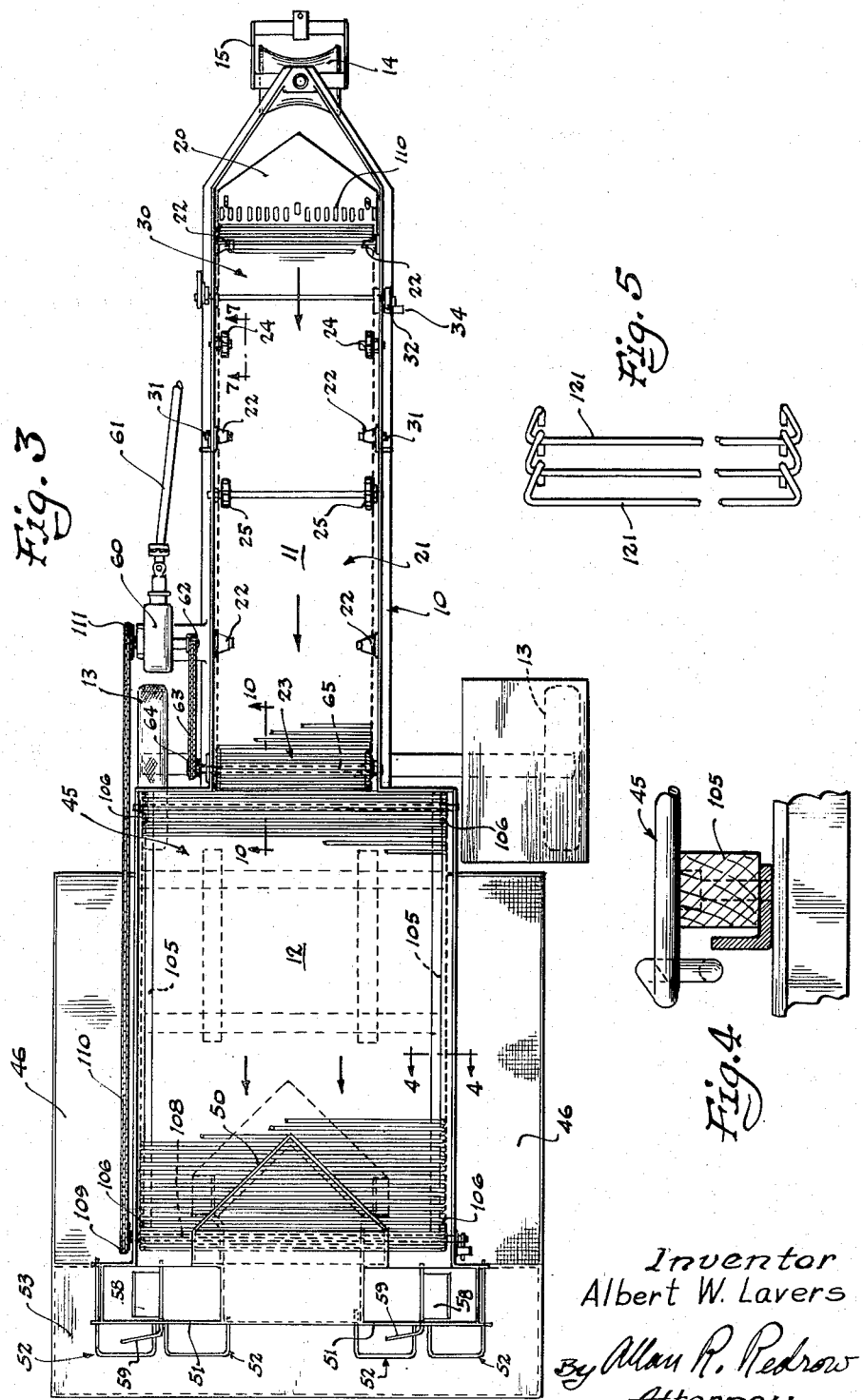

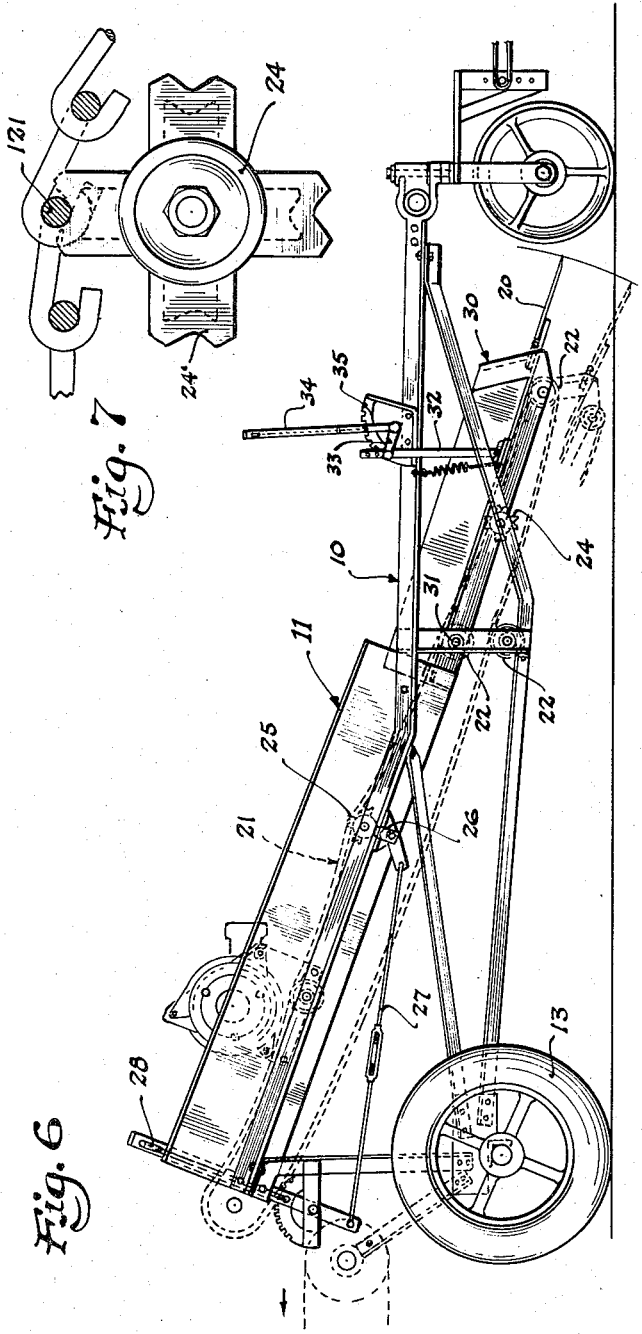

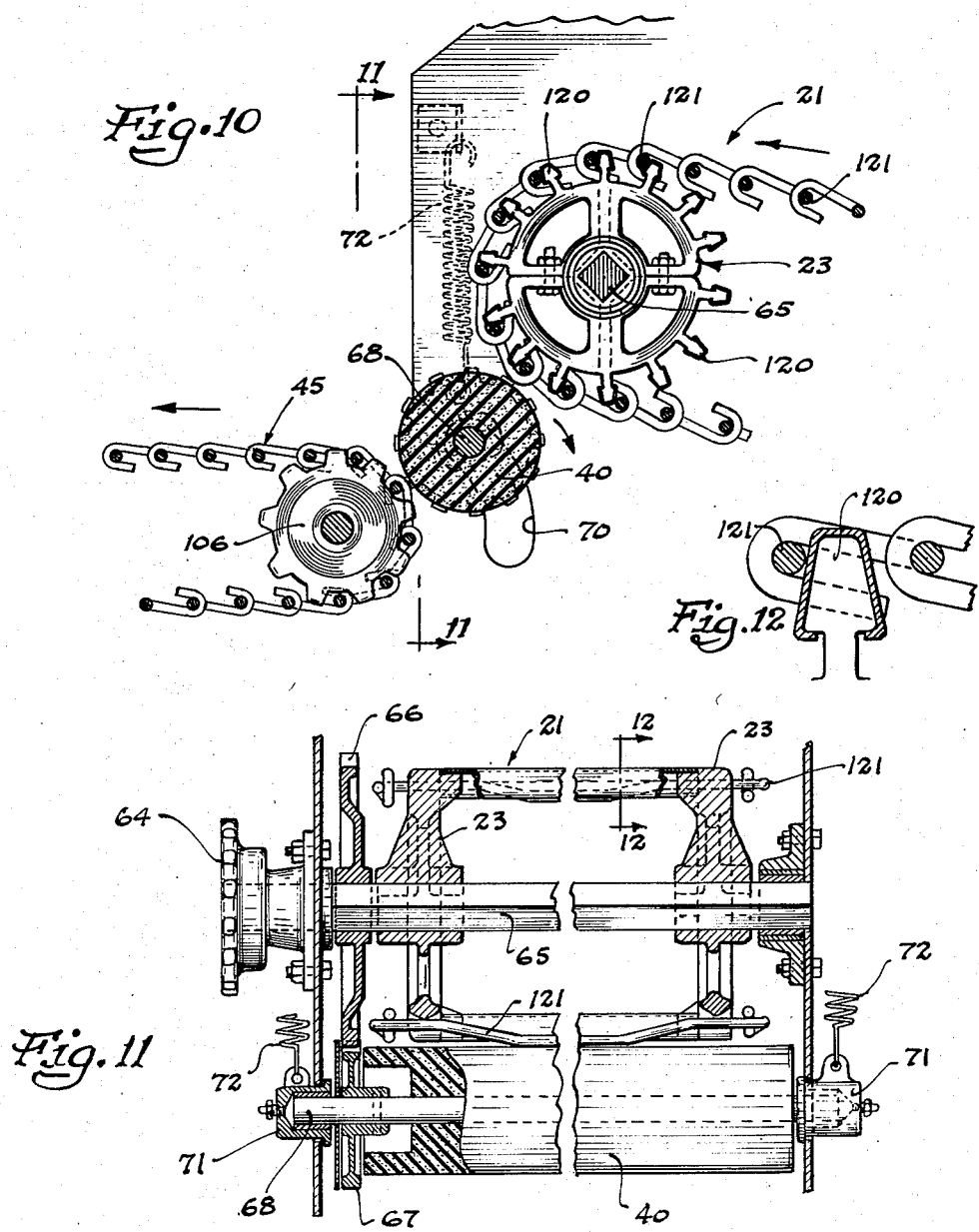

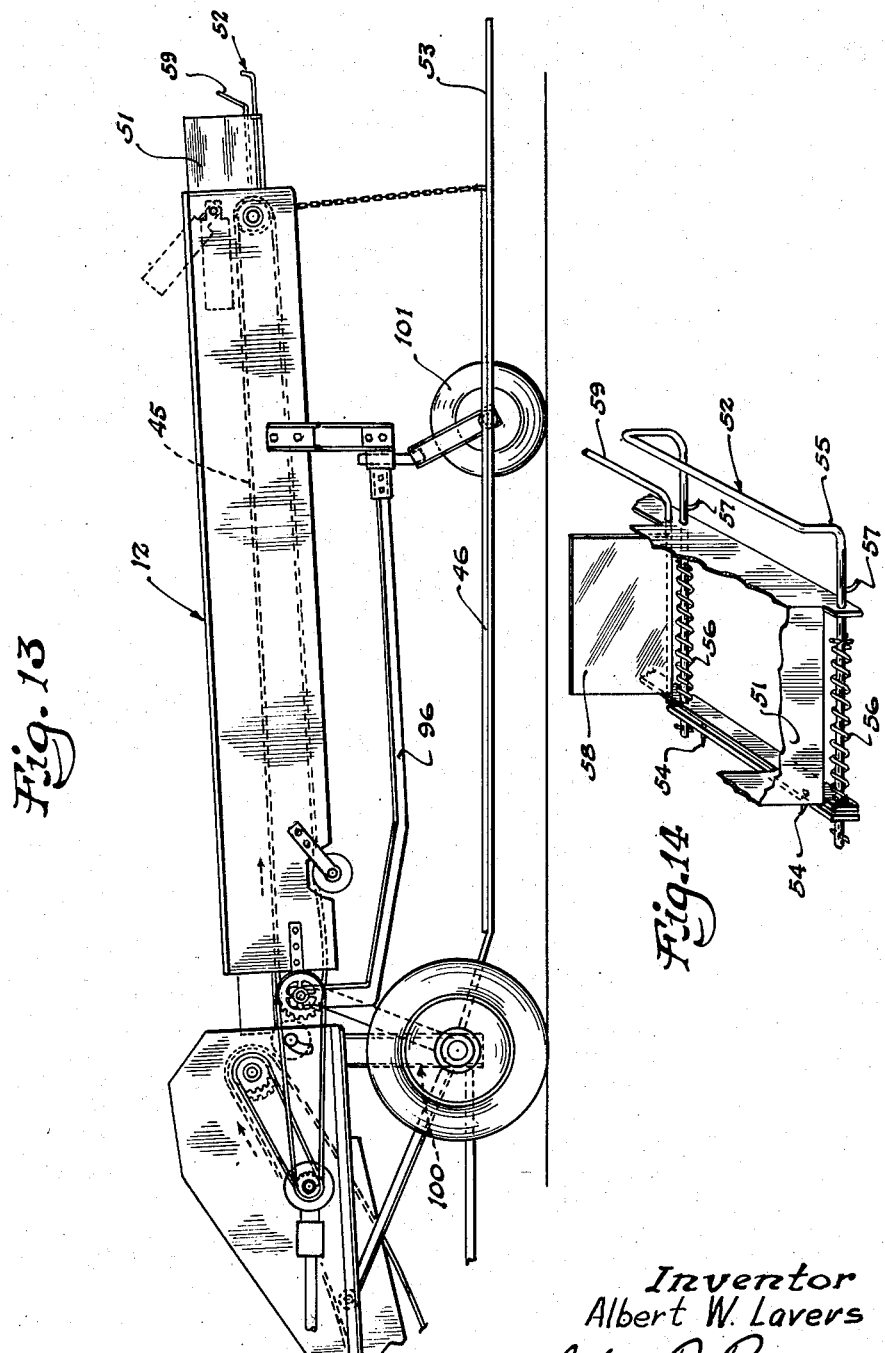

United States Patent Office 2,711,742
Patented June 28, 1955

2,711,742
POTATO VINE STRIPPER

Albert W. Lavers, Chicago, Ill., assignor to The New Holland Machine Division of The Sperry Corporation, New Holland, Pa., a corporation of Delaware Application May 2, 1950, Serial No. 159,576

5 Claims. (Cl. 130—30)

This invention relates to the harvesting of potatoes and the like and more particularly is concerned with an improved machine for digging such crops from the soil, eliminating the plant or vines, and delivering the crops to a sorting table where rocks and other debris may be eliminated therefrom while the potatoes or the like are being delivered to a bagging station.

The machine forming the subject of this invention basically is built around a wheeled frame having a front shovel and elevating conveyor and a rear sorting and bagging conveyor. The front end of the frame of the machine, may be supported on a ground or clod crushing wheel or may be carried from a tractor drawbar, and in the latter case, the clod crushing means may be made moveable so that it may be lifted from its bearing on the soil. The invention includes means to selectively shake the elevating conveyor if desired to assist in separating the dirt from the crops being harvested, and also provides improved means to cooperate with the elevating conveyor to eliminate most of the vines or plant leaves that are plowed up with the crops. Thereafter the crops are delivered to another conveyor over which several operators may work to sort the crops while simultaneously effecting the delivery thereof to bagging means.

Suitable means may be provided to adjust the various elements of the machine, and in a modified form of the machine, an elongated frame structure may be provided having articulated elevating and sorting sections. Other improvements reside in the provision of powered means for accomplishing certain of the required adjustments and improved means for mounting the elevating conveyor structure.

Several embodiments of the machine are shown in the drawings, wherein:

Figure 1 is a side elevation of the preferred form of the machine;

Figure 2 is an end elevation of the machine shown in Figure 1;

Figure 3 is a top plan view of the machine shown in Figure 1;

Figure 4 is an enlarged view taken on line 4—4 of Figure 3;

Figure 5 is a detail plan view showing the conveyor structure;

Figure 6 is an enlarged side elevation of a modified form of the front section of the machine similar to that shown on Figure 1;

Figure 7 is an enlarged view taken on line 7—7 of Figure 3;

Figure 10 is an enlarged view taken on line 10—10 of Figure 3;

Figure 11 is a view taken on line 11—11 of Figure 10;

Figure 12 is an enlarged view taken on line 12—12 of Figure 11;

Figure 13 is a side elevation of a modified sorting conveyor structure; and

Figure 14 is a perspective, partly broken away, showing one of the bag holding means disposed at the rear of the harvesting machine.

Figure 8:
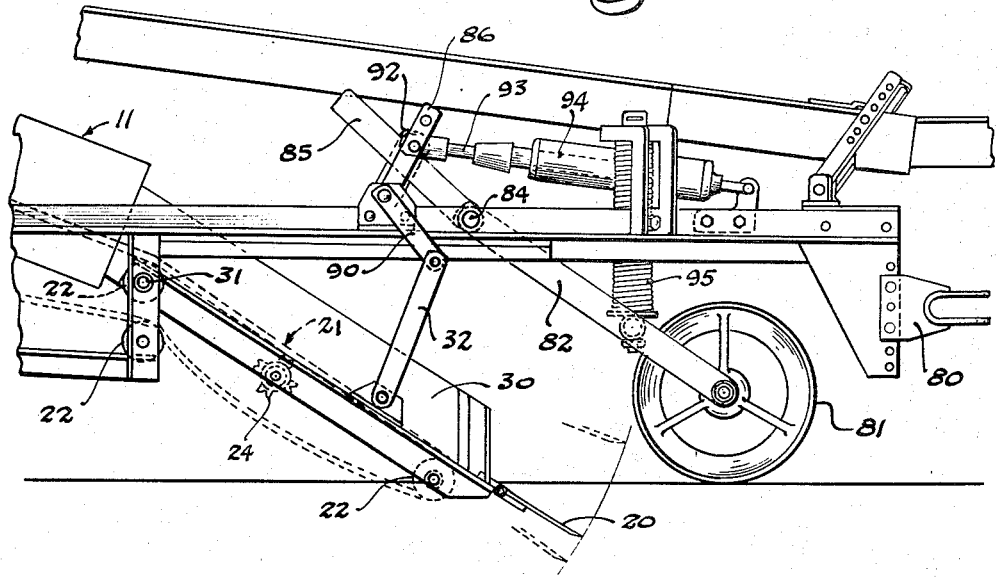
Figure 8 is a side elevation of another modified front end structure for the machine.

The machine of this invention is designed to be pulled through a field to dig potatoes or similar crops from the soil and feed the potatoes to an elevating conveyor where the dirt and some of the debris falls through the conveyor. All of the remaining material carried up by the elevating conveyor is passed on to a sorting conveyor where the potatoes or other crops are separated from the unwanted debris on the conveyor, and the potatoes and the like are delivered to a bagging station. The machine is built around a wheeled frame 10, and has a front elevating conveyor, section 11, and a rear sorting conveyor, section 12. The frame is supported on a pair of wheels 13 carried a little back of the middle of the frame and in the preferred structure, the front end of the machine is carried on a clod breaking roller 14. The machine is adapted to be hooked up behind a tractor to be towed through the field by means of a hitch 15 which is fixed to the front end of the frame portion of the machine in a manner to leave the machine reasonably free to swing about a horizontal axis.

A shovel 20 is hung from the front end of the machine, which shovel is adapted to be lowered for digging into the ground when in use so as to lift the potatoes or other crops being harvested from the soil. All of the crops dug up by the shovel, together with the soil, pass over the upper surface of the shovel 20 and on to an endless elevating conveyor 21 which carries the material upwardly to deliver it on to the sorting conveyor.

The endless conveyor 21 is supported at its front end and at spaced points along each of its sides on suitable cone shaped bearings 22, and is carried at its rear end on a sprocket type roller 23, as will be described more fully below.

Figure 9:
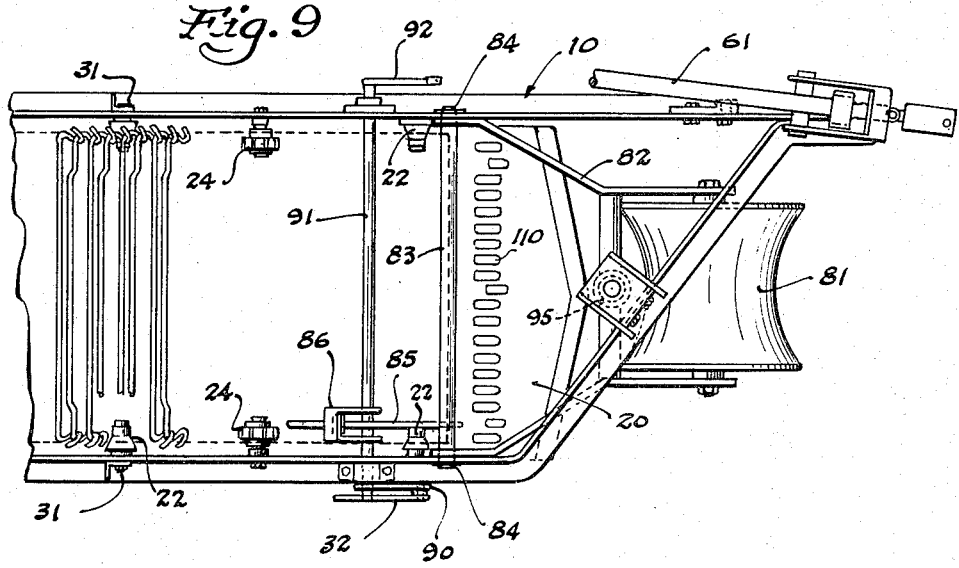
Figure 9 is a top plan view of the structure shown in Figure 8.

The sides of the front elevating conveyor 21 are also made to run over two pairs of opposed sprocket-like rollers 24 and 25, see Figures 3 and 9, which take the form of the sprocket roller shown in Figure 7. As here shown, the pair of sprocket rollers 24 are fixed to the side frame of the front portion of the machine, and as the elevating conveyor moves upwardly, it is engaged successively by the spaced arms 24₁ of the sprocket-like rollers 24 that lift the conveyor up and let it drop a short distance as a succeeding arm comes into contact with the under side of the conveyor. This gentle jostling movement of the conveyor over the sprocket-like rollers 24 effects a controlled agitation whereby to produce a sifting function to cause the dirt to separate from the solid material being carried up on the conveyor 21. Ordinarily, a single shaking, such as is accomplished by moving the conveyor over one pair of the sprocket-like rollers 24, is sufficient to separate the soil from the solid matter. Sometimes, however, a further shaking operation is desired, and for this purpose, the second pair of sprocket rollers 25 is provided, and as best shown in Figure 6, the additional sprocket rollers are each mounted on the free ends of the oscillatable arms 26 which are keyed to a rotatably mounted cross shaft that has another arm fixed thereto that is adapted to be connected to a link 27, which in turn is connected to hand lever 28 so that the pair of sprocket rollers 25 may be raised into contact with the underside of the elevating conveyor 21, as shown in Figure 6, or may be moved into a position out of engagement with the under side of the conveyor so as to minimize the shaking action when it is not required.

The shovel 20, as above stated, may be raised or lowered into any one of a number of positions, depending upon how deep in the soil the crop to be harvested is disposed. For this purpose, the shovel is fixedly secured on the forward end of a swinging frame 30, see Figure 1, which frame is pivotally supported on bearings 31 carried on the main frame 10 of the machine. The front end of the frame 30 is provided with an upwardly extending link 32 that is pivotally connected to a bell crank lever 33 which may be adjusted upwardly or downwardly by hand lever 34 that cooperates with the locking plate 35 so as to raise and lower the shovel 20.

In towing the harvesting machine to the field, the shovel 20 is normally carried in the position shown in Figure 1, and when the machine is adjusted for harvesting, the shovel 20 may be lowered, as shown in Figure 8, so as to dig into the ground just deep enough to raise all of the crop to the surface without going any deeper.

As the potatoes or other crops are delivered over the shovel and upwardly along the elevating conveyor, the dirt is shaken free and the particular crop is prepared for delivery to the sorting table. As the crop falls over the upper end of the elevating conveyor 21, it lands on a rubber coated roller 40, see Figure 10, which bears against the outside and under surface of the conveyor 21 as it is carried around on the sprocket roller 23. The fall of the crop is thus broken by landing on the rubber surface of roller 40, and also the roller 40 is driven at approximately the same speed as the conveyor 21 so that a wringer roll arrangement is provided by these co-operating elements.

This arrangement makes possible quick elimination of vines, leaves, and the like while the larger portions of the crops such as potatoes, beets, and the like, are pulled free from the plant to which they are attached and fall downwardly onto the conveyor 45. The leaves and such debris as are carried through between the roller 40 and the lower run of the endless elevating conveyor, are allowed to fall free through the bottom of frame 10 onto the ground.

The harvested crop material delivered to conveyor 45, which includes the potatoes, etc., stones, and other extraneous material such as some of the vines or plants, passes rearwardly along the conveyor 45, and operators standing upon the platform 46 disposed on each side of the machine, sort out the crop from the debris. Depending upon the proportion of the crop as compared with the debris to be separated therefrom, the sorting table may be used to deliver the debris backwardly to the tail end of the machine where it is dumped onto the ground, or if only a small quantity of rocks and other material are passed onto the sorting machine, the debris may be manually lifted from the sorting conveyor to be thrown over the sides of the sorting conveyor while the potatoes or other crops are delivered rearwardly to bagging means.

To accomplish the delivery of potatoes to the bagging means, a V-shaped plow or guide 50 may be provided at the rear end of the machine, the plow being pivotally mounted so that it may be moved into either of the positions indicated in Figure 1. When the crops, along with a heavy quantity of debris are delivered onto the sorting conveyor from the elevating conveyor 21, the guide 50 is lifted upwardly and the crops being harvested are sorted by the operators who pick the crops out of the debris and lay the selected crops over on the outer edges of the sorting conveyor 45. As this conveyor moves rearwardly, the potatoes or the like are delivered over the end of the sorting conveyor at the sides thereof where they fall into guide chutes 51 that deliver them into burlap bags which are carried on bag supporting means 52, see Figures 1, 3, and 14, in the several positions at each side of the sorting conveyor to receive the potatoes. The heavy load of debris passes backwardly under the raised guide 50 and falls downwardly onto the ground.

When the quantity of debris coming over onto the sorting conveyor is rather light such that it may be all picked free, the guide 50 may be fixed in the lower position shown in Figure 1, and as the crops move back on the conveyor 45, all of the debris is picked free and thrown over the side of the machine by the operators. The crops are then carried back against the V-shaped guide 50 and are moved sideways on the conveyor 45 so that the crops pass into the bagging means. The bags are supported on suitable platforms 53, and also an operator stands on the platform at the rear of the machine to attach bags to the empty bag supporting racks 52 and remove the filled bags from the machine as quickly as the crops are loaded into the bags.

The device for holding the bags may take any conventional form, but a particularly easy one to operate is shown in Figure 14. In this instance, the bag holder is built integral with the bottom of the chute 51 and a pair of hook elements 54 are provided at the front side of the chute which side is remote from the platform 53 that is adapted to support the bags and upon which the operator stands. A generally U-shaped bar element 55 is slidably mounted to fit around the remaining three sides of the chute, and a pair of springs 56 are mounted between the front wall of chute 51 and suitable pin stops on the bar element 55 to hold the U-shaped element projected rearwardly. A second pair of bag holding hooks 57 are fixed to the underside of the bar element 55 at points near the rearmost end of the bag holder. With this structure, when the mouth of a bag is positioned on the pairs of hooks 54 and 57, the springs 56 urge the bar element rearwardly and the mouth of the bag is thus held stretched open under the open bottom end of chute 51.

A pair of such bag holding means are disposed below the lower ends of each of the chutes 51 and a flap 58 of a size to close off half of chute 51 and having a handle 59 by which it may be oscillated to alternately open and close the respective halves of said chute, is disposed within the lower end of the chute to direct the flow of crops falling through the chute into either one or the other of the bags carried on the holding means 52. As one bag is being filled, the previously filled bag may be removed and a new bag hung in position to receive the flow as soon as the position of flap 58 is changed within the chute. Such an arrangement is provided at each side of the machine at the end of the sorting conveyor's run.

The drive for all of the moving parts is taken from a central point, and the conveyors and wringer roll arrangement are all driven from the gear reduction mechanism 60, see Figure 3, which receives its power from a shaft 61 that may be connected to the power take-off of a tractor through any conventional means. The gear box 60 is provided with a sprocket 62 which drives a sprocket chain 63 that in turn drives a sprocket 64, Figures 3 and 11, fixed to the axle 65 of the roller 23 which supports the upper end of the elevating conveyor. This supplies the power for driving the elevating conveyor whereby the crops are lifted from the shovel 20 up to the sorting conveyor.

The wringer roll 40 which cooperates with the sprocket roller 23 and the under side of the elevating conveyor where it is carried over the sprocket roller 23, is driven from the axle 65 of the roller 23 by a gear 66 which meshes with a gear 67. The gear 67 is keyed to the axle 68 upon which the roller 40 is supported so that wringer roll and the elevating conveyor cooperate as described above to eliminate vines, leaves, and the like to drive them through between the roller and conveyor so they may be dropped onto the ground.

The wringer roller 40 is mounted for movement through the arcuate slots 70, see Figures 1 and 10, provided on each side of the machine so that in case of a jam, the wringer roll may move downwardly to let the accumulated material move through. Suitable slide bearings 71 are provided for carrying the axle 68 in slot 70 and the slide bearings 71 are adapted to move through the slots 70 in a manner to effect a quick opening, relatively, between the surface of the elevating conveyor and wringer roll 40. A pair of springs 72 are mounted on each side of the machine to urge the slide bearings 71 upwardly so that the wringer roll 40 ordinarily occupies the position shown in Figure 10, and gears 66 and 67 are held in mesh.

A modified front end structure for mounting the shovel and clod crusher roll is shown in Figures 8 and 9, and in this arrangement of the machine, the front end of the potato harvester is adapted to be carried on a hitch 80 which is adapted to be supported on the draw bar of a tractor. As here shown, the clod breaking roller 81 is carried on a yoke or frame 82 integral with an axle 83 that is mounted for oscillation on the main frame 10 in the bearings 84. One end of axle 83 has an extending arm 85 fixed integral therewith, which arm projects generally upwardly to cooperate with a roller carried in yoke 86 which engages the arm 85 to press it downwardly to raise the clod breaking roller out of contact with the soil whenever the shovel 20 is elevated.

As best shown in Figure 8, the shovel 20 and its hinge frame 30, which is carried on bearings 31, is adapted to be lifted by the link 32 connected between the frame 30 and a bell crank lever 90. The lever 90 is keyed to a driven shaft 91 which has an operating lever 92 fixed thereto. The lever 92 is adapted to be connected to the moving end 93 of the piston that is driven to reciprocate in a hydraulic cylinder 94, when fluid under pressure is supplied thereto, so that the shovel and clod breaking roller may be raised and lowered during operation of the machine. With this arrangement, the shovel may be quickly lifted from the soil to avoid striking obstructions which may be encountered during the normal harvesting operation, and it may also be used to elevate both the shovel and clod crusher during transporation of the harvester to and from the fields. It will be noted that the clod breaking roller 81 is normally projected downwardly by means of the spring 95, and that the yoke 86 and arm 85 provide a lost motion coupling whereby the clod crusher is left free to normally ride over the irregular surface of the soil, but which coupling is operative to positively engage arm 85 to pick up the clod crusher when it is to be raised clear of the soil. When it is necessary to lift roller 81, the clod breaking roller may be raised against the action of spring 93 as arm 85 is pushed downwardly by the roller on yoke 86 as described above.

A further modification of the machine is disclosed in Figure 13 wherein an articulated frame structure is provided to support the elevating structure and sorting table. The rear sorting conveyor section 12 of the machine shown in this figure, is carried on a frame structure 96 that is connected to the front elevating conveyor frame by means of the horizontally disposed bearings 100. The frame structure 96 is also supported on the rear caster wheel 101, and thus the sorting conveyor frame here described, may follow the contour of the ground independently of the front section of the machine.

The articulated structure above described has been found desirable where it is necessary to have several operators working adjacent the sorting conveyor, and an elongated sorting section may be needed to accommodate the increased number of persons. In this instance, the machine shown in Figure 1 would become too long and unwieldy, and therefore, the articulated structure shown in Figure 13 has been provided.

In either of the forms of the machine shown in Figure 1 or Figure 13, the structure shown in Figure 4 may be provided for supporting the sorting conveyor. As shown in Figure 4, the conveyor 45 is carried at each side upon a cushioned slide member 105 so that the sorting conveyor moves in a smooth, even plane from its beginning to its end. This has been found most desirable in order to minimize injury to the crop which might be occasioned by unduly agitating the product on the conveyor when it is not cushioned by soil as is the case when the crop is being carried on the elevating conveyor.

The endless sorting conveyor is carried over a pair of supporting rollers mounted at each end and the rearmost roller 106 is keyed to an axle 108 which has a sprocket wheel 109 fixed thereto. The sprocket wheel 109 cooperates with a sprocket chain 110 which in turn is driven from a sprocket wheel 111 that derives its power from the main gear box drive 60.

As best shown in Figure 10, the front elevating conveyor is carried at its rear end on a sprocket roll 23 having teeth 120 that are of a size and shape to fill the space between the bars 121 which make up the surface of the elevating conveyor, see Figure 5. The teeth 120 project through the spaces so as to not only serve as an effective driving support for the conveyor, but they also serve to push out any rocks or other solid matter that might otherwise tend to become wedged in the spaces. Thus, the conveyor is simultaneously cleaned while it is being driven. Furthermore, the teeth 120 fill the spaces between the bars forming the conveyor surface so that a substantially solid under surface is here presented in opposition to and for cooperation with the surface of the wringer roll 40 whereby to effectively eliminate most of the vines, leaves, and the like that fall into the bight between the rollers 23 and 40.

The above described machines operate to dig potatoes and other similar crops from the soil when the shovel 20 is lowered into its digging position and all of the dirt and other matter above the shovel are delivered over the pivotally mounted bridging fingers 110 to the upper surface of the elevating conveyor 21. The soil and solid materials lifted up with the conveyor, and depending upon the type of soil in which the crop is dug, the elevating conveyor is agitated more or less to break the soil free from the solid material. The soil sifts downwardly through the space provided between the bars 121, and the solid material is delivered up over the end of the conveyor so that the leaves, vines, and the like are dropped into a position to feed in between the two rollers forming the wringer rolls whereby to separate the major portion of this type of material from the crops. The separated leafy material is delivered downwardly through the rollers and falls onto the ground while the potatoes or other crops are passed rearwardly onto the sorting conveyor. Other solid material passes onto the sorting conveyor with the potatoes, etc., and as the material moves backwardly on the sorting conveyor 45, the rocks and other debris may be lifted from the conveyor by operators standing upon the platform 46. The potatoes are then delivered to the bagging means provided at the rear of the machine.

In some cases, where the crop may not be easily separated from its stem, as in the harvesting of green potatoes, the wringer function of roll 40 is preferably eliminated and this is accomplished by inserting suitable spacer blocks in slot 70 above bearings 71 so that gears 66 and 67 are held spaced apart and out of mesh. This lowering of roller 40 is done in such a case to avoid any possibility of damaging the crop in effecting the relative pulling of the crop free from its stem. All possibility of crushing a tender crop is thus eliminated and the crop, together with its leafy structure is gently passed over to the sorting table where the operators may manually pick the crops free from their leafy structure.

The machine is preferably driven from a power take-off through the drive shaft 61 having a suitable clutch arrangement, however, it is obvious that the machine may be provided with a motor for driving the conveyors and perhaps propelling the harvester through the fields. These and many other modifications may be conceived which will fall within the scope of the following claims.

I claim:

1. A root crop harvester comprising a supporting frame, a sprocket roller rotatably supported in said frame, an endless elevating conveyer having its discharge end disposed around and supported by said roller, said conveyer comprising relatively spaced parallel bars linked together at their extremities, said sprocket roller having axially extending teeth projecting between adjoining conveyer bars, said bars and said teeth jointly defining a substantially continuous cylindrical surface, means for rotating said roller to cause operative movement of said elevating conveyer in a direction to discharge over said roller, a vine removing roll rotatably mounted in said frame below and in horizontally overlapping parallel relation with the discharge end of said conveyer to receive crop material discharged from the elevator conveyer means resiliently urging said vine removing roll into engagement with said substantially continuous cylindrical surface, means rotating said vine removing roll in an opposite direction to the movement of said elevator conveyer to thereby rotate in engagement with said conveyer and alternately cooperate with said conveyer and said sprocket roller teeth in frictionally gripping and removing vines from the root crops passing over said removing roll, a sorting conveyer being disposed adjacent and at a level below said vine removing roll on the horizontally opposite side thereof from the said elevator conveyor whereby the roots delivered onto said roll will fall onto said sorting conveyer.

2. A root crop harvester comprising a supporting frame, a sprocket roller rotatably supported in said frame, an endless elevating conveyer having its discharge end disposed around and supported by said roller, said conveyer comprising relatively spaced parallel bars linked together at their extremities, said sprocket roller having axially extending teeth projecting between adjoining conveyer bars, said bars and said teeth jointly defining a substantially continuous cylindrical surface, means for causing operative movement of said elevating conveyer around said roller in a direction to discharge over said roller, a vine removing roll rotatably mounted in said frame below and in horizontally overlapping parallel relation with the discharge end of said conveyer to receive crop material discharged from the elevator conveyer, means resiliently urging said vine removing roll into engagement with said substantially continuous cylindrical surface, to thereby rotate in engagement with said conveyer and alternately cooperate with said conveyer and said sprocket roller teeth in frictionally gripping and removing vines from the root crops passing over said removing roll, a sorting conveyer being disposed adjacent and at a level below said vine removing roll on the horizontally opposite side thereof from the said elevator conveyor, whereby the roots delivered on to said roll will fall onto said sorting conveyer.

3. A root crop harvester comprising a supporting frame, a sprocket roller rotatably supported in said frame, an endless elevating conveyer having its discharge end disposed around and supported by said roller, said conveyer comprising relatively spaced parallel bars linked together at their extremities, said sprocket roller having axially extending teeth projecting between adjoining conveyer bars, said bars and said teeth jointly defining a substantially continuous cylindrical surface, means for causing operative movement of said elevating conveyer around said roller in a direction to discharge over said roller, a vine removing roll rotatably mounted in said frame below and in horizontally overlapping parallel relation with the discharge end of said conveyer to receive crop material discharged from the elevator conveyer, means resiliently urging said vine removing roll into engagement with said substantially continuous cylindrical surface, to thereby rotate in engagement with said conveyer and cooperate with said conveyer in frictionally gripping and removing vines from the root crops passing over said removing roll.

4. A root crop harvester comprising a supporting frame, a sprocket roller rotatably supported in said frame, an endless elevating conveyer having its discharged end disposed around and supported by said roller, said conveyer comprising relatively spaced parallel bars linked together at their extremities, said sprocket roller having axially extending teeth projecting between adjoining conveyer bars, said bars and said teeth jointly defining a substantially continuous cylindrical surface, means for causing operative movement of said elevating conveyer around said roller in a direction to discharge over said roller, a vine removing roll rotatably mounted in said frame below and in horizontally overlapping parallel relation with the discharge end of said conveyer and normally in engagement with said substantially continuous cylindrical surface to thereby alternately cooperate with said conveyer and said sprocket roller teeth in frictionally gripping and removing vines from the root crops passing over said removing roll.

5. A root crop harvester comprising a supporting frame, a sprocket roller rotatably supported in said frame, an endless elevating conveyer having its discharge end disposed around and supported by said roller, said conveyer comprising relatively spaced parallel bars linked together at their extremities, said sprocket roller having axially extending teeth projecting between adjoining conveyer bars, said bars and said teeth jointly defining a substantially continuous cylindrical surface, means for causing operative movement of said elevating conveyer around said roller in a direction to discharge over said roller, a vine removing roll rotatably mounted in said frame below and in horizontally overlapping relation with the discharge end of said conveyer and normally in engagement with said substantially continuous cylindrical surface to thereby alternately cooperate with said conveyer and said roller teeth in frictionally gripping and removing vines from the root crops passing over said removing roll.

References Cited in the file of this patent

UNITED STATES PATENTS

| | | |
|---|---|---|
| 1,715,218 | Wright et al. | May 28, 1929 |
| 1,789,527 | Larinan | Jan. 20, 1931 |
| 2,365,077 | Hertzler et al. | Dec. 12, 1944 |
| 2,468,639 | Sample | Apr. 26, 1949 |